US012810886B2

(12) United States Patent
Wang et al.

(10) Patent No.: US 12,810,886 B2
(45) Date of Patent: Nov. 24, 2026

(54) METHOD FOR CONSTRUCTING TRANSVERSE AUDIBLE NOISE MODEL FOR AN ELECTRIC TRANSMISSION CORRIDOR, MICROPHONE SUPPORT APPARATUS, AND AUDIBLE NOISE MEASUREMENT DEVICE

(71) Applicants: STATE GRID HENAN ELECTRIC POWER RESEARCH INSTITUTE, Zhengzhou (CN); GLOBAL ENERGY INTERCONNECTION RESEARCH INSTITUTE CO., LTD., Beijing (CN); STATE GRID CORPORATION OF CHINA, Beijing (CN)

(72) Inventors: Donghui Wang, Zhengzhou (CN); Songyang Zhang, Zhengzhou (CN); Zhuangzhuang Zhang, Zhengzhou (CN); Yi Yang, Zhengzhou (CN); Diming Wan, Zhengzhou (CN); Leilei Wang, Zhengzhou (CN); Degui Yao, Zhengzhou (CN); Zhongbin Lv, Zhengzhou (CN); Guangzhou Wang, Zhengzhou (CN); Jingkai Nie, Zhengzhou (CN); Qiang He, Zhengzhou (CN); Chao Fan, Zhengzhou (CN)

(73) Assignees: State Grid Henan Electric Power Research Institute, Zhengzhou (CN); Global Energy Interconnection Research Institute Co., Ltd., Beijing (CN); State Grid Corporation of China, Beijing (CN)

( * ) Notice: Subject to any disclaimer, the term of this patent is extended or adjusted under 35 U.S.C. 154(b) by 103 days.

(21) Appl. No.: 19/027,314

(22) Filed: Jan. 17, 2025

(65) Prior Publication Data

US 2025/0166651 A1 May 22, 2025

Related U.S. Application Data

(63) Continuation of application No. PCT/CN2023/124692, filed on Oct. 16, 2023.

(30) Foreign Application Priority Data

Dec. 20, 2022 (CN) ......................... 202211644008.2

(51) Int. Cl.
*G10L 21/0216* (2013.01)
*G10L 25/48* (2013.01)
*H04R 3/00* (2006.01)

(52) U.S. Cl.
CPC .......... *G10L 21/0216* (2013.01); *G10L 25/48* (2013.01); *H04R 3/005* (2013.01)

(58) Field of Classification Search
USPC ............................................................ 700/94
See application file for complete search history.

(56) References Cited

U.S. PATENT DOCUMENTS

2017/0347170 A1 11/2017 Liao
2023/0071544 A1 * 3/2023 Perrodin ................. G01M 3/24

FOREIGN PATENT DOCUMENTS

CN 101221202 A 7/2008
CN 203443611 U 2/2014

(Continued)

OTHER PUBLICATIONS

Ha et al, "Fault Detection on Transmission Lines . . . " [online]. ieee.org, 2012 [retrieved Jul. 15, 2026]. Retrieved from the internet <URL: https://ieeexplore.ieee.org/stamp/stamp.jsp?tp=&arnumber=5958604> (Year: 2012).*

(Continued)

*Primary Examiner* — Alexander Krzystan
*Assistant Examiner* — Sean Rinehart
(74) *Attorney, Agent, or Firm* — MOSER TABOADA

(57) ABSTRACT

Provided are a method for constructing a transverse audible noise model for an electric transmission corridor, a microphone support apparatus, and an audible noise measurement device. The method for constructing the transverse audible noise model for the electric transmission corridor includes measuring noise at the background noise measurement point of the electric transmission corridor, the N noise measure- (Continued)

ment points of the electric transmission corridor, and the M noise verification points of the electric transmission corridor simultaneously; fitting an objective function $$z = k_1 \sin(k_2 x) + k_3 e^{k_4 x} + k_5 x^3 + k_6 x^2 + k_7 x + k_8$$

to a point sequence constructed based on a noise correction value $DB^A{}_n$, and coordinates ($x_n$, 0); and in response to determining that a mean error between $DB^B{}_m$ and the objective function satisfies accuracy requirements, obtaining the transverse audible noise model for the electric transmission corridor.

12 Claims, 5 Drawing Sheets

(56) References Cited

FOREIGN PATENT DOCUMENTS

| | | | | | |
|---|---|---|---|---|---|
| CN | 104132728 | A | | 11/2014 | |
| CN | 109470905 | A | | 3/2015 | |
| CN | 104597333 | A | | 5/2015 | |
| CN | 104636801 | A | | 5/2015 | |
| CN | 204666249 | U | | 9/2015 | |
| CN | 107831411 | A | | 3/2018 | |
| CN | 207083195 | U | | 3/2018 | |
| CN | 108090287 | A | | 5/2018 | |
| CN | 109188114 | A | | 1/2019 | |
| CN | 211744462 | U | | 10/2020 | |
| CN | 111985113 | A | | 11/2020 | |
| CN | 212903518 | U | | 4/2021 | |
| CN | 112863536 | A | * | 5/2021 | ......... G10L 21/0224 |
| CN | 112904141 | A | | 6/2021 | |
| CN | 113221413 | A | | 8/2021 | |
| CN | 214843610 | U | | 11/2021 | |
| CN | 114034375 | A | | 2/2022 | |
| CN | 114184886 | A | | 3/2022 | |
| CN | 114910118 | A | | 8/2022 | |
| CN | 115840094 | A | | 3/2023 | |
| CN | 219102509 | U | | 5/2023 | |
| CN | 117192166 | A | | 12/2023 | |
| CN | 119394431 | A | * | 2/2025 | ............... G01S 5/22 |
| JP | 2019095315 | A | | 6/2019 | |
| KR | 20200079135 | A | | 7/2020 | |

OTHER PUBLICATIONS

Sun et al, A method for locating abnormal sound in transmission line . . . [online]. Journal of Physics: Conference Series, 2022 [ retrieved on Jul. 15, 2026] from <url: https://iopscience.iop.org/article/10.1088/1742-6596/2384/1/012005> (Year: 2022).*

Chinese Office Action for Application No. 202311098577.6 dated Mar. 26, 2026.

International Search Report for PCT/CN2023/124692 dated Feb. 1, 2024.

Chinese Office Action for Application No. 202211644008.2 dated Jul. 25, 2023.

F. Huang et al., Design and application of indirect detection software for audible noise, 2nd International Conference on Information Technology and Intelligent Control, 2022, 9 pages, vol. 12346, doi: 10.1117/12.2653424.

Di et al., Mechanism and Theoretical Model for Corona Audible Noise from High Voltage AC Transmission Lines, China Academic Journal Electronic Publishing House, 1994-2021, 5 pages, http://www.onki.net, http://www.jdxb.on, http://zkxb.xjtu.edu.cn.

Method for Measurement of audible noise of high voltage overhead transmission lines, People's Republic of China(PRC) electric power industry standard, National Energy Administration, 2017,12 pages.

* cited by examiner

METHOD FOR CONSTRUCTING TRANSVERSE AUDIBLE NOISE MODEL FOR AN ELECTRIC TRANSMISSION CORRIDOR, MICROPHONE SUPPORT APPARATUS, AND AUDIBLE NOISE MEASUREMENT DEVICE

CROSS-REFERENCE TO RELATED APPLICATIONS

This is a continuation of International Patent Application No. PCT/CN2023/124692, filed on Oct. 16, 2023, which claims priority to Chinese Patent Application No. 202211644008.2 filed with the China National Intellectual Property Administration (CNIPA) on Dec. 20, 2022, the disclosures of which are incorporated herein by reference in their entireties.

TECHNICAL FIELD

The present application relates to the field of audible noise measurement technology for transmission lines, for example, a method for constructing a transverse audible noise model for an electric transmission corridor, a microphone support apparatus, and an audible noise measurement device.

BACKGROUND

Transmission line noise refers to an audible noise that is generated by corona discharge in the air surrounding the line and that can be directly heard by the human ear. The standard "Audible Noise Measurement Method for High-Voltage Overhead Transmission Lines" (DL/T501-2017) provides systematic guidelines for measuring audible noise from a transmission line.

According to the standard "Audible Noise Measurement Method for High-Voltage Overhead Transmission Lines" (DL/T501-2017), when measuring audible noise from a transmission line, those skilled in the art should use point-based measurement. For example, to measure the lateral attenuation characteristics of noise on a single-circuit three-phase transmission line, 15 measurement points are required, with a specified location for each measurement point. The standard also recommends prioritizing synchronous measurement for lateral distribution measurement.

Currently, there is a transmission corridor formed by two parallel transmission lines, for example, a transmission corridor formed by an alternating current (AC) transmission line and a direct current (DC) transmission line arranged in parallel. In this case, audible noise from one line influences audible noise from the other line, rendering the preceding measurement method unsuitable for measuring audible noise in the transmission corridor.

SUMMARY

The present application provides a method for constructing a transverse audible noise model for an electric transmission corridor, a microphone support apparatus, and an audible noise measurement device to reduce electrical interference in audible noise measurement and thus ensure the accuracy of such measurement.

The present application provides a method for constructing a transverse audible noise model for an electric transmission corridor. The method for constructing the transverse audible noise model for the electric transmission corridor is applied to an audible noise measurement device for the electric transmission corridor. The audible noise measurement device for the electric transmission corridor includes a processor, N microphones disposed at N noise measurement points of the electric transmission corridor separately, M microphones disposed at M noise verification points of the electric transmission corridor separately, and a microphone disposed at a background noise measurement point of the electric transmission corridor, where N is greater than or equal to 10, and M is greater than or equal to 1. The N noise measurement points of the electric transmission corridor are collinear, perpendicular to the projection of a transmission line on the ground, and at a preset height above the ground. Each of the M noise verification points of the electric transmission corridor is disposed between two adjacent ones of the N noise measurement points of the electric transmission corridor. The background noise measurement point of the electric transmission corridor is disposed away from the electric transmission corridor. The method for constructing the transverse audible noise model for the electric transmission corridor includes the following:

Noise at the background noise measurement point of the electric transmission corridor, the N noise measurement points of the electric transmission corridor, and the M noise verification points of the electric transmission corridor are measured by multiple microphones simultaneously, where each noise verification point of the electric transmission corridor is disposed between two adjacent ones of the N noise measurement points of the electric transmission corridor, and the number of the multiple microphones is N+M+1.

Noise values measured at the N noise measurement points of the electric transmission corridor and noise values measured at the M noise verification points of the electric transmission corridor are individually corrected by the processor; a point sequence is constructed by letting n range from 1 to N and m range from 1 to M, assuming that a noise correction value at a noise measurement point whose coordinates are $(x_n, 0)$ in the electric transmission corridor is $$DB_n^A,$$

and that a noise correction value at a noise verification point whose coordinates are $(x_m, 0)$ in the electric transmission corridor is $$DB_m^B,$$

and letting x be $x_n$ and z be $$DB_n^A;$$

and fitting an objective function $$z = k_1 \sin(k_2 x) + k_3 e^{k_4 x} + k_5 x^3 + k_6 x^2 + k_7 x + k_8$$

to the point sequence to obtain values of constants $k_1$, $k_2$, $k_3$, $k_4$, $k_5$, $k_6$, $k_7$, and $k_8$, where $k_1$, $k_2$, $k_3$, $k_4$, $k_5$, $k_6$, $k_7$, and $k_8$ are not all zero simultaneously.

In response to determining that a mean error between $$DB_m^B$$

and $$k_1\sin(k_2x_m)+k_3e^{k_4x_m}+k_5x_m^3+k_6x_m^2+k_7x_m+k_8$$

satisfies accuracy requirements, the transverse audible noise model for the electric transmission corridor is obtained as follows:

$$z=k_1\sin(k_2x)+k_3e^{k_4x}+k_5x^3+k_6x^2+k_7x+k_8.$$

Here z denotes audible noise at point (x, 0).

A microphone support apparatus includes a height-adjustable stand, a microphone securing cantilever arm, an electrical shielding cover, a positioning device, and an inductive charge grounding device. The microphone securing cantilever arm is secured to the height-adjustable stand. The electrical shielding cover is secured to a cantilever end of the microphone securing cantilever arm. The inductive charge grounding device is electrically connected to a conductive part of the electrical shielding cover, a conductive part of the height-adjustable stand, and a conductive part of the microphone securing cantilever arm. The positioning device is secured to the microphone securing cantilever arm. When the microphone support apparatus is used, a microphone is disposed in the electrical shielding cover and secured to the microphone securing cantilever arm, a lead-out wire of the microphone is secured to the microphone securing cantilever arm, and a grounding end of the inductive charge grounding device is grounded.

An audible noise measurement device includes microphones, an audible-noise-related meteorological sensor, a sampling circuit, a processor, and an output apparatus. N+M+1 microphones are provided, where N is greater than or equal to 10, and M is greater than or equal to 1 The microphones are disposed on the preceding microphone support apparatus.

Reference list: 11. transmission tower; 12. transmission line; 21. noise measurement point of an electric transmission corridor; 22. noise verification point of an electric transmission corridor; 23. background noise measurement point; 3. meteorological data measurement point; 4. processor; 51. height-adjustable stand; 511. tripod; 512. height adjustment guide rod; 513. locking part; 514. guide hole; 515. connecting platform; 52. microphone securing cantilever arm; 53, electrical shielding cover; 54. positioning device; 55. inductive charge grounding device; 61. microphone; 62. lead-out wire of a microphone; 63. windscreen

DETAILED DESCRIPTION

The following illustrates the present application in conjunction with embodiments to assist those skilled in the art in understanding and implementing the present application. Unless otherwise stated, the following embodiments and terms therein should not be understood outside the technical knowledge background of the art.

Figure 1:
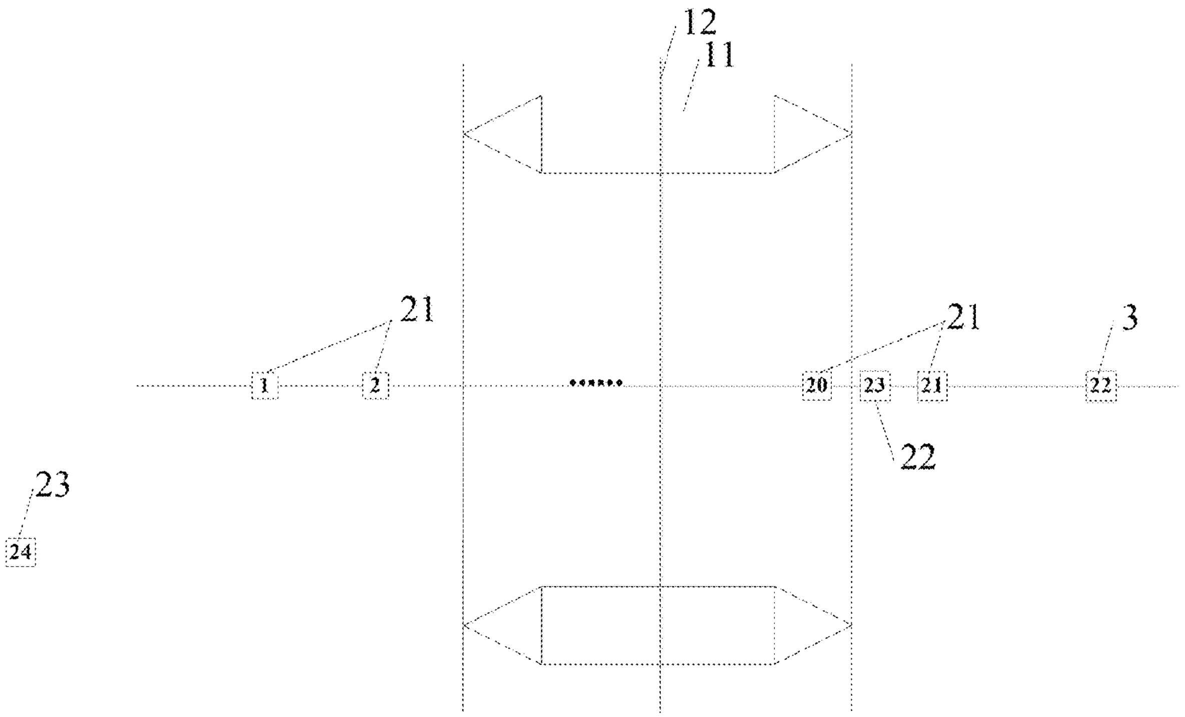
FIG. 1 is reference diagram one of the usage state of an audible noise measurement device for an electric transmission corridor.
Figure 2:
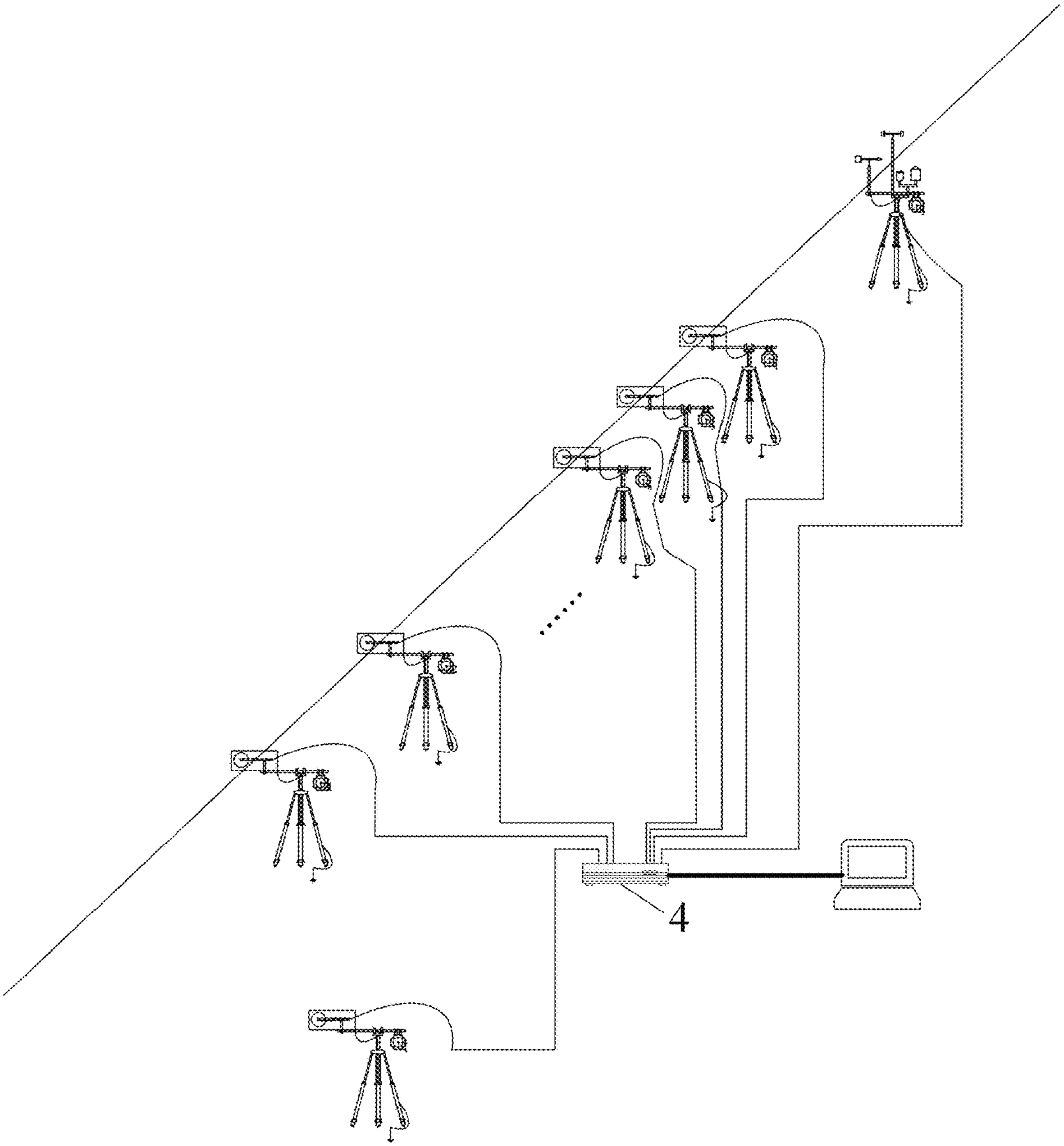
FIG. 2 is reference diagram two of the usage state of an audible noise measurement device for an electric transmission corridor.
Figure 5:
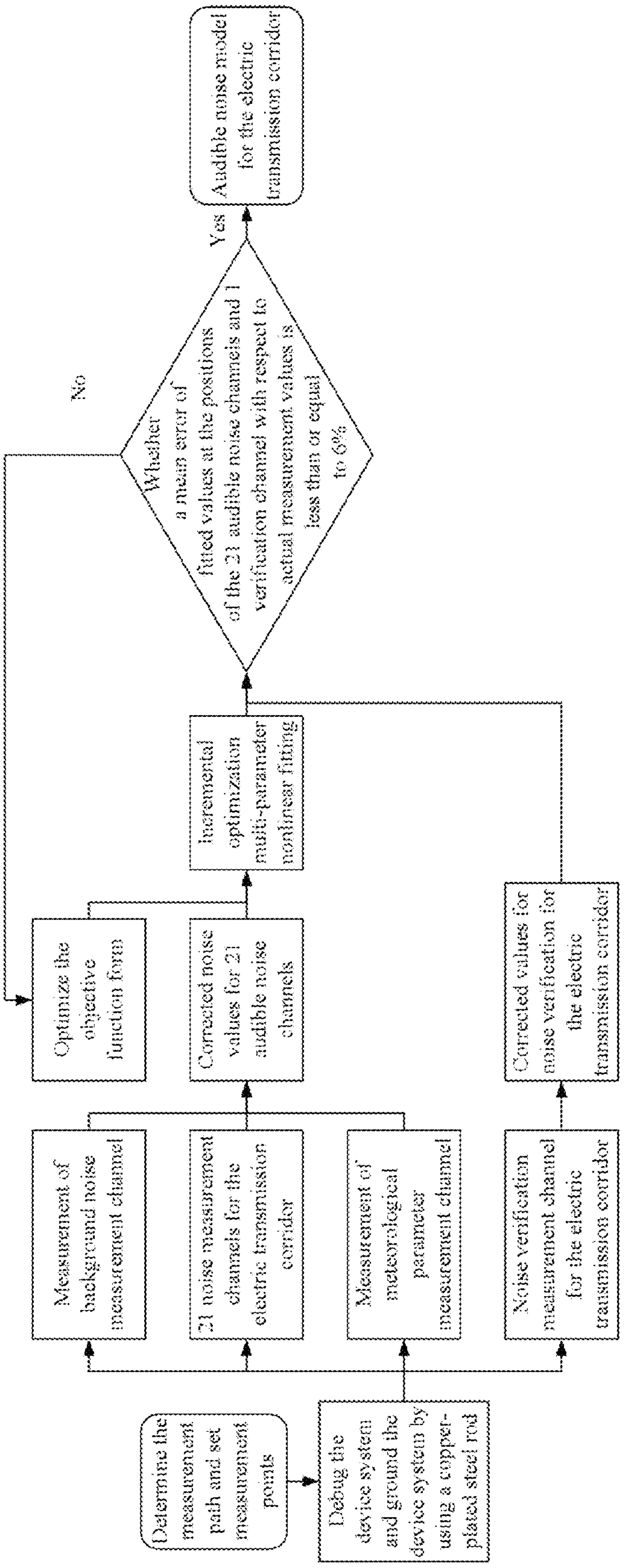
FIG. 5 is a flowchart for constructing a transverse audible noise model for an electric transmission corridor by using an audible noise measurement device for the electric transmission corridor.

Embodiment one: A method for constructing a transverse audible noise model for an electric transmission corridor is applied to an audible noise measurement device for the electric transmission corridor as shown in FIGS. 1 and 2. The audible noise measurement device for the electric transmission corridor includes a processor, N microphones 61 disposed at N noise measurement points 21 of the electric transmission corridor separately, M microphones 61 disposed at M noise verification points 22 of the electric transmission corridor separately, and a microphone 61 disposed at a background noise measurement point 23 of the electric transmission corridor. The N noise measurement points 21 of the electric transmission corridor are collinear, perpendicular to the projection of a transmission line 12 on the ground, and at a preset height above the ground. Each noise verification point 22 of the electric transmission corridor is disposed between two adjacent noise measurement points 21 of the electric transmission corridor. The background noise measurement point 23 of the electric transmission corridor is disposed away from the electric transmission corridor. Referring to FIG. 5, the method for constructing the transverse audible noise model for the electric transmission corridor includes the following:

In step S11, multiple microphones 61 measure noise at the background noise measurement point 23 of the electric transmission corridor, the N (N≥10) noise measurement points 21 of the electric transmission corridor, and the M (M≥1) noise verification points 22 of the electric transmission corridor simultaneously. Each noise verification point 22 of the electric transmission corridor is disposed between two adjacent noise measurement points 21 of the electric transmission corridor. The number of the multiple microphones 61 is N+M+1.

The "Audible Noise Measurement Method for High-Voltage Overhead Transmission Lines" (DL/T501-2017) specifies that when the lateral attenuation characteristics of audible noise from a high-voltage overhead transmission line are measured, as shown in FIG. 2, the noise measurement points should be disposed at a height of more than 1.2 meters above the ground and perpendicular to the transmission line 12. In step S11, the noise verification points 22 of the transmission corridor and N (N≥10) noise measurement points 21 of the transmission corridor are disposed at the same height and orientation. The noise measurement points 21 of the transmission corridor are arranged according to the specified measurement positions in the "Audible Noise Measurement Method for High-Voltage Overhead Transmission Lines" (DL/T501-2017); however, since the present application aims to obtain the transverse audible noise model for the electric transmission corridor, the required noise measurement points 21 of the transmission corridor may be fewer than 15. For example, in a three-phase AC transmission corridor, if the noise measurement points 21 of the transmission corridor are arranged at intervals of 5 meters, only 10 noise measurement points 21 of the transmission corridor are required.

In step S11, when a noise verification point 22 of the electric transmission corridor is disposed between two adjacent noise measurement points 21 of the electric transmission corridor, it is also important to ensure that the distance between the noise verification point 22 and the adjacent noise measurement points 21 is appropriate to avoid affecting the accuracy of the audible noise measurement at the noise measurement points 21 of the electric transmission corridor.

In step S11, the background noise measurement point 23 of the electric transmission corridor may be disposed at a location far away from the measured electric transmission corridor and other audible noise sources.

The "Audible Noise Measurement Method for High-Voltage Overhead Transmission Lines" (DL/T501-2017) specifies that for short-term audible noise measurement, the minimum meteorological data recorded for an AC overhead transmission line include rainfall and wind speed while the minimum meteorological data recorded for a DC overhead transmission line include wind speed and relative humidity; and for long-term audible noise measurement, the minimum meteorological data recorded include rainfall, wind speed, temperature, and humidity. Therefore, in step S11, the corresponding meteorological data are synchronously measured. The meteorological data measurement point 3 may be disposed outside the line connecting the noise measurement points 21 of the electric transmission corridor, aiming to minimize its impact on the accuracy of the audible noise measurement at the noise verification points 22, the background noise measurement point 23, and the noise measurement points 21 of the electric transmission corridor.

In step S12, noise values measured at the N noise measurement points 21 of the electric transmission corridor and noise values measured at the M noise verification points 22 of the electric transmission corridor are individually corrected; a point sequence is constructed by letting n range from 1 to N, and m range from 1 to M, respectively, assuming that a noise correction value at a noise measurement point whose coordinates are ($x_n$, 0) in the electric transmission corridor is $$DB_n^A,$$

and a noise correction value at a noise verification point whose coordinates are ($x_m$, 0) in the electric transmission corridor is $$DB_m^B,$$

and letting x be $x_n$ and z be $$DB_n^A;$$

and fitting an objective function $$z = k_1\sin(k_2x) + k_3e^{k_4x} + k_5x^3 + k_6x^2 + k_7x + k_8$$

to the point sequence to obtain values of constants $k_1$, $k_2$, $k_3$, $k_4$, $k_5$, $k_6$, $k_7$, and $k_8$, where $k_1$, $k_2$, $k_3$, $k_4$, $k_5$, $k_6$, $k_7$, and $k_8$ are not all zero simultaneously.

The "Audible Noise Measurement Method for High-Voltage Overhead Transmission Lines" (DL/T501-2017) describes a noise measurement correction method. The Chinese patent document CN107831411A also discloses a method for correcting corona audible noise measurement of an AC transmission line under different rainfall conditions by using functional relationships and background noise sound pressure level correction curves. Both methods can be used in step S12 to correct the noise values measured at noise measurement points 21 and noise verification points 22 of the electric transmission corridor.

In step S13, in response to determining that the mean error between $$DB_m^B$$

and $$k_1\sin(k_2x_m) + k_3e^{k_4x_m} + k_5x_m^3 + k_6x_m^2 + k_7x_m + k_8$$

satisfies the accuracy requirements, the transverse audible noise model for the electric transmission corridor is obtained:

$$z = k_1\sin(k_2x) + k_3e^{k_4x} + k_5x^3 + k_6x^2 + k_7x + k_8$$

z denotes audible noise at point (x, 0).

In this step, the objective function $$z = k_1\sin(k_2x) + k_3e^{k_4x} + k_5x^3 + k_6x^2 + k_7x + k_8$$

is fit to the point sequence by using an incremental optimization multi-parameter nonlinear fitting method to obtain the values of the constants $k_1$, $k_2$, $k_3$, $k_4$, $k_5$, $k_6$, $k_7$, and $k_8$. S12 includes the following:

In step S121, an initial point $$k^0 = (k_1^0, k_2^0, k_3^0, k_4^0, k_5^0, k_6^0, k_7^0, k_8^0)$$

is selected, an initial parameter $\alpha^0$ is set to greater than 0, an amplification factor $\beta$ is set to greater than 1, an allowable error $\varepsilon$ is set to greater than 0, and i is set to 1;

In step S122, before an $i^{th}$ iteration, a residual $f(k^{i-1})$ and a quadratic sum $s(k^{i-1})$ of the residual are calculated; $\nabla f(k^{i-1})$ is calculated (that is, calculating the Jacobi matrix); in response to $\|\nabla f(k^{i-1})^T f(k^{i-1})\| < \varepsilon$, iteration is ended, $$k_1 = k_1^i,\ k_2 = k_2^i,\ k_3 = k_3^i,\ k_4 = k_4^i,\ k_5 = k_5^i,\ k_6 = k_6^i,\ k_7 = k_7^i, \text{ and } k_8 = k_8^i;$$

and in response to $\|\nabla f(k^{i-1})^T f(k^{i-1})\| \leq \varepsilon$, the next step is executed.

In step S123, $[\nabla f(k^{i-1})^T \nabla f(k^{i-1}) + \alpha^{i-1} I]^{-1}$ is calculated.

In step S124, letting $d^{i-1} = -[\nabla f(k^{i-1})^T \nabla f(k^{i-1}) + \alpha^{i-1} I]^{-1} (\nabla f(k^{i-1})^T f(k_{i-1}))$, a residual $f(k^{i-1}+d^{i-1})$ and a quadratic sum $s(k^{i-1}+d^{i-1})$ of the residual are calculated; in response to $s(k^{i-1}+d^{i-1}) \geq s(k^{i-1})$, step S123 is proceeded by letting $\alpha_{i-1} = \beta\alpha^{i-1}$; and in response to $s(k^{i-1}+d^{i-1}) < s(k^{i-1})$, step S122 is proceeded by letting $k' = k^{i-1} + d^{i-1}$ $$\alpha^i = \frac{\alpha^{i-1}}{\beta},$$

and i=i+1.

Step S121 is to select the initial data while step S122 is to determine whether the accuracy of fitting of the objective function $$z = k_1 \sin(k_2 x) + k_3 e^{k_4 x} + k_5 x^3 + k_6 x^2 + k_7 x + k_8$$

with the point sequence satisfies the requirements before the $i^{th}$ iteration. If the requirements are satisfied, the iteration ends, and the number of iterations is i−1. If the requirements are not satisfied, the $i^{th}$ iteration is performed. Step S123 and step S124 are designed to enhance the accuracy of fitting of the objective function $$z = k_1^i \sin(k_2^i x) + k_3^i e^{k_4^i x} + k_5^i x^3 + k_6^i x^2 + k_7^i x + k_8^i$$

with the point sequence in the $i^{th}$ iteration. If the accuracy of fitting of the objective function $$z = k_1^i \sin(k_2^i x) + k_3^i e^{k_4^i x} + k_5^i x^3 + k_6^i x^2 + k_7^i x + k_8^i$$

with the point sequence in the $i^{th}$ iteration remains the same or decreases, steps S123 and S124 are repeated to redetermine k' and $\alpha^i$. If the accuracy of fitting of the objective function $$z = k_1^i \sin(k_2^i x) + k_3^i e^{k_4^i x} + k_5^i x^3 + k_6^i x^2 + k_7^i x + k_8^i$$

with the point sequence in the $i^{th}$ iteration is higher, step S122 is used to determine whether the accuracy of fitting of the objective function $$z = k_1^i \sin(k_2^i x) + k_3^i e^{k_4^i x} + k_5^i x^3 + k_6^i x^2 + k_7^i x + k_8^i$$

with the point sequence in the $i^{th}$ iteration satisfies the requirements.

In this embodiment, in step S13, if the mean error between $$DB_m^B$$

and $$k_1 \sin(k_2 x_m) + k_3 e^{k_4 x_m} + k_5 x_m^3 + k_6 x_m^2 + k_7 x_m + k_8$$

is less than ε, the mean error between $$DB_m^B$$

and $$k_1 \sin(k_2 x_m) + k_3 e^{k_4 x_m} + k_5 x_m^3 + k_6 x_m^2 + k_7 x_m + k_8$$

is determined to satisfy the accuracy requirements, and the transverse audible noise model for the electric transmission corridor is obtained.

In this embodiment, N is 21, M is 1, and ε is 6%. Based on multiple experiments, it has been found that when the value range of N is 20 to 22, the value range of M is 1 to 3, and the value range of ε is 5.5% to 6.5%, the transverse audible noise model for the electric transmission corridor can also be obtained. However, outside this range, when the value of N is reduced and the value of ε is guaranteed, even if the value range of M is 1 to 3, the transverse audible noise model for the electric transmission corridor cannot be obtained; and when the value of N is increased, only if the value of ε is increased, can the transverse audible noise model for the electric transmission corridor be obtained, but such a transverse audible noise model has a lower accuracy (that is, the value of ε is larger).

It is to be understood that the larger N is, the more precise the values of the constants $k_1$, $k_2$, $k_3$, $k_4$, $k_5$, $k_6$, $k_7$, and $k_8$ obtained in step S12. However, due to the limited fitting accuracy in fitting the objective function $$z = k_1 \sin(k_2 x) + k_3 e^{k_4 x} + k_5 x^3 + k_6 x^2 + k_7 x + k_8$$

to the point sequence by using the incremental optimization multi-parameter nonlinear fitting method, the values of the constants $k_1$, $k_2$, $k_3$, $k_4$, $k_5$, $k_6$, $k_7$, and $k_8$ may not be obtained. A larger M and the more rationally arranged noise verification points of the electric transmission corridor result in a better verification effect of the objective function determined by the constants $k_1$, $k_2$, $k_3$, $k_4$, $k_5$, $k_6$, $k_7$, and $k_8$ in step S13. Generally, in step S13, setting the value of M to 1, 2, or 3 allows for error verification of the objective function obtained in step S12.

Figure 3:
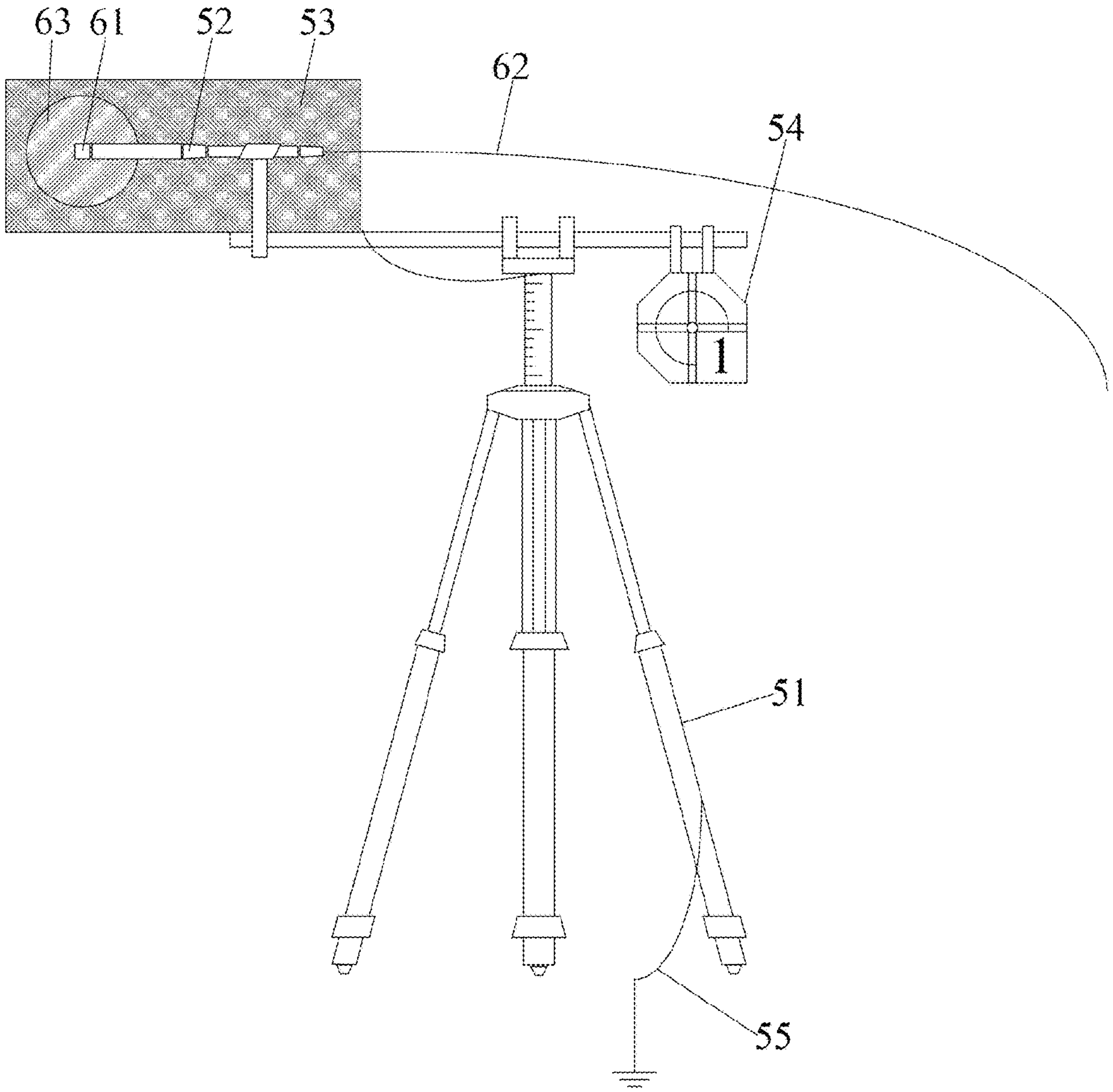
FIG. 3 is a reference diagram of the usage state of a microphone support apparatus.

Embodiment two: An audible noise measurement device, as shown in FIGS. 1 to 3, includes a microphone 61, an audible-noise-related meteorological sensor, a sampling circuit, a processor 4, and an output apparatus. (N+M+1) microphones 61 are provided. The microphones 61 are disposed on a microphone support apparatus, where N is greater than or equal to 10, and M is greater than or equal to 1. In this embodiment, twenty-three microphones 61 are provided.

When the microphone 61 is an analog sensor, the microphone 61 and the sampling circuit form a digital sensor. When the audible-noise-related meteorological sensor is an analog sensor, the audible-noise-related meteorological sensor and the sampling circuit form a digital sensor. Generally, the sampling circuit includes an amplification circuit, a filtering circuit, and an analog-to-digital conversion circuit. The processor 4 may be a microcontroller, a programmable logic controller (PLC), an industrial computer, or an electronic computer. The output apparatus may be, for example, a display, a speaker, a printer, or a fax machine.

The "Audible Noise Measurement Method for High-Voltage Overhead Transmission Lines" (DL/T501-2017) specifies that for short-term audible noise measurement, the minimum meteorological data recorded for an AC overhead transmission line include rainfall and wind speed while the minimum meteorological data recorded for a DC overhead transmission line should include wind speed and relative humidity; and for long-term audible noise measurement, the minimum meteorological. data recorded include rainfall, wind speed, temperature, and humidity. Therefore, audible-noise-related meteorological sensors include wind speed sensors, temperature sensors, and humidity sensors, and may also include rainfall sensors.

Referring to FIG. 3, the microphone support apparatus of this embodiment includes a height-adjustable stand 51, a microphone securing cantilever arm 52, a positioning device 54, an electrical shielding cover 53, and an inductive charge grounding device 55. The microphone securing cantilever arm 52 is secured to the height-adjustable stand 51. The electrical shielding cover 53 is secured to a cantilever end of the microphone securing cantilever arm 52. The inductive charge grounding device 55 is electrically connected to a conductive part of the electrical shielding cover 53, a conductive part of the height-adjustable stand 51, and a conductive part of the microphone securing cantilever arm 52. The positioning device 54 is secured to the microphone securing cantilever arm 52. When the microphone support apparatus is used, a microphone 61 is disposed in the electrical shielding cover 53 and secured to the microphone securing cantilever arm 52, a lead-out wire 62 of the microphone is secured to the microphone securing cantilever arm 52, and a grounding end of the inductive charge grounding device 55 is grounded.

The "Audible Noise Measurement Method for High-Voltage Overhead Transmission Lines" (DL/T501-2017) specifies that for measuring the lateral attenuation characteristics of audible noise for a high-voltage overhead transmission line, noise measurement points should be set perpendicular to the transmission line and at a height of at least 1.2 meters above the ground. In practice, the background noise measurement point of the transmission corridor, the N (N≥10) noise measurement points of the transmission corridor, and the M (M≥1), noise verification points of the electric transmission corridor may differ in terms of the height above the ground. Therefore, the height-adjustable stand 51 is essential.

The microphone 61 is disposed inside the electrical shielding cover 53 and is secured to the microphone securing cantilever arm 52. The lead-out wire 62 of the microphone is also secured to the microphone securing cantilever arm 52. By disposing the microphone 61 away from the height-adjustable stand, this arrangement prevents the height-adjustable stand from affecting the accuracy of the audible noise measurement. Securing the lead-out wire 62 to the microphone securing cantilever arm 52 also prevents the lead-out wire 62 from dragging the microphone 61, ensuring a consistent microphone position. After grounded via the inductive charge, grounding device 55, the electrical shielding cover 53 remains electrically neutral, ensuring the accuracy of the audible noise measurement. If the height-adjustable stand 51, the microphone securing cantilever arm 52, and the positioning device 54 also include conductors, these should also be connected to the inductive charge grounding device 55. The positioning device 54 is mainly configured to accurately measure the coordinates of the N (N≥10) noise measurement points of the electric transmission corridor and the M (M≥1) noise verification points of the electric transmission corridor.

In this embodiment, the positioning device 54 is a cross-shaped positioning target marked with digital numbering.

In this embodiment, the inductive charge grounding device 55 includes electrically connected copper wires and copper-coated grounding steel spikes. During use, the copper-coated grounding steel spikes are inserted into the ground.

Figure 4:
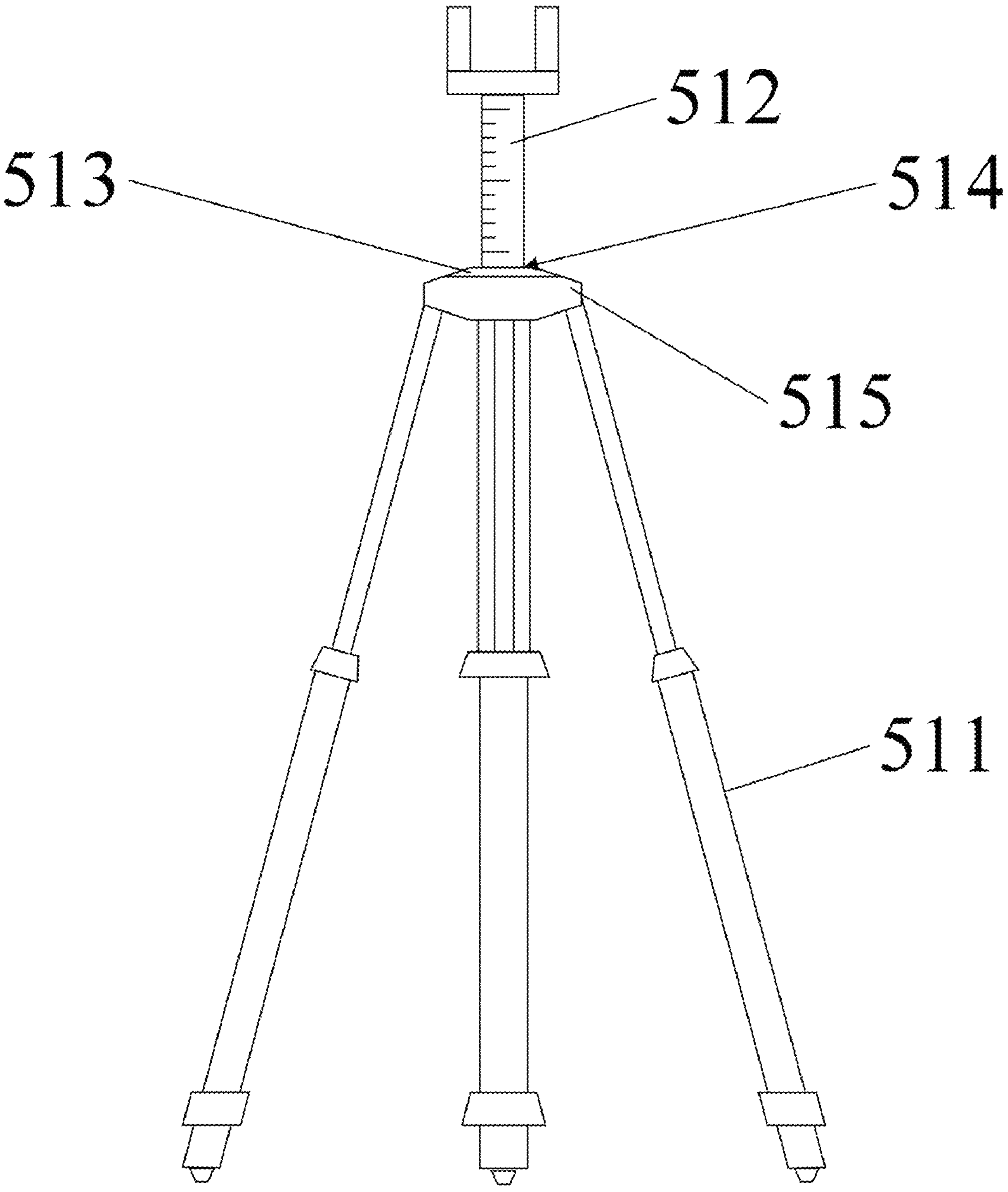
FIG. 4 is a diagram illustrating the structure of a height-adjustable stand of a microphone support apparatus.

Referring to FIG. 4, in this embodiment, the height-adjustable stand 51 includes a tripod 511, a height adjustment guide rod 512, and a locking part 513. A connecting platform 515 of the tripod 511 is provided with a guide hole 514. The height adjustment guide rod 512 is movably connected to the guide hole 514. The locking part 513 is configured to securely connect the height adjustment guide rod 512 and the connecting platform 515 in the axial direction of the guide hole 514.

The tripod 511 may be a tripod used for installation of a total station. After a guide hole 514 is formed in the connecting platform 515 of the tripod, the tripod of this embodiment is formed.

The locking part 513 may be a set screw, a positioning pin, or an internal thread. When the locking part 513 is a positioning pin, a pinhole is disposed on the height adjustment guide rod. When the locking part is an internal thread, an external thread matching the internal thread is disposed on the height adjustment guide rod 512.

The beneficial effects of the present application include:

1. In the method for constructing the transverse audible noise model for the electric transmission corridor, in step S11, noise is measured at the background noise measurement point of the electric transmission corridor, the N (N≥10) noise measurement points of the electric transmission corridor, and the M (M≥1) noise verification points of the electric transmission corridor simultaneously. Compared to time-sharing noise measurement at each point, this method eliminates errors caused by variations in audible noise sources resulting from changes in factors influencing the audible noise of the transmission line. Each noise verification point is disposed between two adjacent noise measurement points of the transmission corridor to facilitate verification of whether the values of the constants $k_1$, $k_2$, $k_3$, $k_4$, $k_5$, $k_6$, $k_7$, and $k_8$ obtained in the next step satisfy the model requirements. In step S12, noise values measured at the noise measurement points of the electric transmission corridor and noise values measured at the noise verification points of the electric transmission corridor are individually corrected, and the corrected noise values correspond to audible noise. The following operations are performed: constructing a point sequence by letting n range from 1 to N and m range from 1 to M, assuming that a noise correction value at a noise measurement point whose coordinates are $(x_n, 0)$ in the electric transmission corridor is $$DB_n^A,$$

and that a noise correction value at a noise verification point whose coordinates are ($x_m$, 0) in the electric transmission corridor is $$DB_m^B,$$

and letting x be $x_n$ and z be $$DB_n^A;$$

and fitting an objective function $$z = k_1\sin(k_2x) + k_3e^{k_4x} + k_5x^3 + k_6x^2 + k_7x + k_8$$

to the point sequence to obtain the values of the constants $k_1$, $k_2$, $k_3$, $k_4$, $k_5$, $k_6$, $k_7$, and $k_8$, where $k_1$, $k_2$, $k_3$, $k_4$, $k_5$, $k_6$, $k_7$, and $k_8$ are not all zero simultaneously. In this step, the applicant proposes the objective $$z = k_1\sin(k_2x) + k_3e^{k_4x} + k_5x^3 + k_6x^2 + k_7x + k_8$$

which considers the nonlinear variation characteristics of the audible noise along the transmission corridor measurement path as obtained by field measurement. Compared to traditional objective functions based on polynomial construction, this method results in a smoother and more accurate overall fit. After the values of the constants $k_1$, $k_2$, $k_3$, $k_4$, $k_5$, $k_6$, $k_7$, and $k_8$ are obtained, step S13 involves comparing the corrected noise value $$DB_m^B$$

at the noise verification point ($x_m$, 0) of the electric transmission corridor with the theoretically calculated audible noise value in $$k_1\sin(k_2x_m) + k_3e^{k_4x_m} + k_5x_m^3 + k_6x_m^2 + k_7x_m + k_8$$

to determine if the mean error satisfies the accuracy requirements. If the mean error satisfies the accuracy requirements, the transverse audible noise model $$z = k_1\sin(k_2x) + k_3e^{k_4x} + k_5x^3 + k_6x^2 + k_7x + k_8$$

for the transmission corridor is obtained. Here z represents the audible noise at point (x, 0). This model allows precise estimation and characterization of the transverse audible noise distribution of the transmission corridor based on a limited number of measurement points.

2. In the method for constructing the transverse audible noise model for the electric transmission corridor, step S12 uses an incremental optimization multi-parameter nonlinear fitting method to fit the objective function $$z = k_1\sin(k_2x) + k_3e^{k_4x} + k_5x^3 + k_6x^2 + k_7x + k_8$$

to the point sequence to obtain the values of the constants $k_1$, $k_2$, $k_3$, $k_4$, $k_5$, $k_6$, $k_7$, and $k_8$, having a high fitting efficiency and ensuring the maximum fitting error accuracy.

3. In the method for constructing the transverse audible noise model for the electric transmission corridor, an incremental optimization multi-parameter nonlinear fitting method is used to fit the objective function $$z = k_1\sin(k_2x) + k_3e^{k_4x} + k_5x^3 + k_6x^2 + k_7x + k_8$$

to the point sequence. Step S121 is to select the initial data while step S122 is to determine whether the accuracy of fitting of the objective function $$z = k_1\sin(k_2x) + k_3e^{k_4x} + k_5x^3 + k_6x^2 + k_7x + k_8$$

with the point sequence satisfies the requirements before the $i^{th}$ iteration. If the requirements are satisfied, the iteration ends, and the number of iterations is i−1. If the requirements are not satisfied, the $i^{th}$ iteration is performed. Steps S123 and S124 are designed to enhance the accuracy of fitting of the objective function $$z = k_1^i\sin(k_2^ix) + k_3^ie^{k_4^ix} + k_5^ix^3 + k_6^ix^2 + k_7^ix + k_8^i$$

sequence in the $i^{th}$ iteration. If the accuracy of fitting of the objective function $$z = k_1^i\sin(k_2^ix) + k_3^ie^{k_4^ix} + k_5^ix^3 + k_6^ix^2 + k_7^ix + k_8^i$$

with the point sequence in the $i^{th}$ iteration remains the same or decreases, steps S123 and S124 are repeated to redetermine $k^i$ and $\alpha^i$. If the accuracy of fitting of the objective function $$z = k_1^i\sin(k_2^ix) + k_3^ie^{k_4^ix} + k_5^ix^3 + k_6^ix^2 + k_7^ix + k_8^i$$

with the point sequence in the $i^{th}$ iteration is higher, step S122 is used to determine whether the accuracy of fitting of the objective function $$z = k_1^i\sin(k_2^ix) + k_3^ie^{k_4^ix} + k_5^ix^3 + k_6^ix^2 + k_7^ix + k_8^i$$

with the point sequence in the $i^{th}$ iteration satisfies the requirements. In this manner, the calculation is performed by a computer, ensuring a high fitting efficiency.

4. In the method for constructing the transverse audible noise model for the electric transmission corridor, a larger value of N is preferable because this allows for the collection of more actual noise values. Similarly, larger and more rationally distributed values of M are also beneficial because this improves the verification effect of the values of the constants $k_1$, $k_2$, $k_3$, $k_4$, $k_5$, $k_6$, $k_7$, and $k_8$ obtained in step S12. Conversely, a smaller value of ε enhances the fitting accuracy. However, in practice, the distribution of transverse audible noise in the transmission corridor exhibits sharp points, and N, M, and ε have unreasonable values, leading to failed fitting. In the present application, the value range of N is 20 to 22, the value range of M is 1 to 3, and the value range of ε is 5.5% to 6.5%. In this manner, the transverse audible noise model is obtained. This model can collect a sufficient amount of actual noise data and ensure an extremely high fitting accuracy.

5. In the method for constructing the transverse audible noise model for the electric transmission corridor, N is 21, M is 1, and ε is 6%. In this manner, the transverse audible noise model is obtained. This model can collect a sufficient amount of actual noise data and ensure an extremely high fitting accuracy.

6. In practice, the background noise measurement point of the transmission corridor, the N (N≥10) noise measurement points of the transmission corridor, and the noise verification points of the electric transmission corridor may differ in terms of the height. Therefore, the microphone support apparatus of the present application requires a height-adjustable stand. The microphone is disposed inside the electrical shielding cover and secured to the microphone securing cantilever arm. The lead-out wire of the microphone is also secured to the microphone securing cantilever arm. By disposing the microphone away from the height-adjustable stand, this arrangement prevents the height-adjustable stand from affecting the accuracy of the audible noise measurement. Securing the lead-out wire to the microphone securing cantilever arm also prevents the lead-out wire from dragging the microphone to avoid a non-consistent microphone position. After being grounded via the inductive charge grounding device, the electrical shielding cover remains electrically neutral, reducing electrical interference in the audible noise measurement and avoiding the influence on the accuracy of the audible noise measurement. If the height-adjustable stand, the microphone securing cantilever arm, and the positioning device also include conductors, these should also be connected to the inductive charge grounding device. The positioning device is mainly configured to accurately measure the coordinates of the N (N≥10) noise measurement points of the electric transmission corridor and the noise verification points of the electric transmission corridor.

7. The height-adjustable stand in the microphone support apparatus of the present application includes a tripod, a height adjustment guide rod, and a locking part. A guide hole is disposed on a connecting platform of the tripod. The height adjustment guide rod is movably connected to the guide hole. The locking part is configured to securely connect the height adjustment guide rod and the connecting platform in the axial direction of the guide hole. This simple structure of the height-adjustable stand is typically a general-purpose component that incurs low production costs.

8. The audible noise measurement device of the present application facilitates the collection of noise obtained in step S11 of the method for constructing the transverse audible noise model for the electric transmission corridor according to the present application.

What is claimed is:

1. A method for constructing a transverse audible noise model for an electric transmission corridor, wherein the method for constructing the transverse audible noise model for the electric transmission corridor is applied to an audible noise measurement device for the electric transmission corridor; the audible noise measurement device for the electric transmission corridor comprises a processor, N microphones respectively disposed at N noise measurement points of the electric transmission corridor, M microphones respectively disposed at M noise verification points of the electric transmission corridor, and a microphone disposed at a background noise measurement point of the electric transmission corridor, wherein N is greater than or equal to 10, M is greater than or equal to 1, the N noise measurement points of the electric transmission corridor are collinear, perpendicular to a projection of a transmission line on a ground, and at a preset height above the ground, each of the M noise verification points of the electric transmission corridor is disposed between two adjacent ones of the N noise measurement points of the electric transmission corridor, and the background noise measurement point of the electric transmission corridor is disposed away from the electric transmission corridor; and the method for constructing the transverse audible noise model for the electric transmission corridor comprises:

measuring, by multiple microphones, noise at the background noise measurement point of the electric transmission corridor, the N noise measurement points of the electric transmission corridor, and the M noise verification points of the electric transmission corridor simultaneously, wherein a number of the multiple microphones is N+M+1;

individually correcting, by the processor, noise values measured at the N noise measurement points of the electric transmission corridor and noise values measured at the M noise verification points of the electric transmission corridor; constructing a point sequence in the following manner: letting n range from 1 to N and m range from 1 to M, assuming that a noise correction value at a noise measurement point whose coordinates are $(x_n, 0)$ in the electric transmission corridor is $$DB_n^A,$$

and that a noise correction value at a noise verification point whose coordinates are $(x_m, 0)$ in the electric transmission corridor is $$DB_m^B,$$

and letting x be $x_n$ and z be $$DB_n^A;$$

and fitting an objective function $z=k_1 \sin(k_2x)+k_3e^{k_4x}+k_5x^3+k_6x^2+k_7x+k_8$ to the point sequence to obtain values of constants $k_1$, $k_2$, $k_3$, $k_4$, $k_5$, $k_6$, $k_7$, and $k_8$, wherein $k_1$, $k_2$, $k_3$, $k_4$, $k_5$, $k_6$, $k_7$, and $k_8$ are not all zero simultaneously; and in response to determining that a mean error between $$DB_m^B \text{ and } k_1\sin(k_2x_m) + k_3e^{k_4x_m} + k_5x_m^3 + k_6x_m^2 + k_7x_m + k_8$$

satisfies accuracy requirements, obtaining the transverse audible noise model for the electric transmission corridor as follows:

$$z=k_1 \sin(k_2x)+k_3e^{k_4x}+k_5x^3+k_6x^2+k_7x+k_8,$$

wherein z denotes audible noise at point (x, 0).

2. The method for constructing the transverse audible noise model for the electric transmission corridor according to claim 1, wherein individually correcting, by the processor, the noise values measured at the N noise measurement points of the electric transmission corridor and the noise values measured at the M noise verification points of the electric transmission corridor; constructing the point sequence by letting n range from 1 to N, and m range from 1 to M, assuming that the noise correction value at the noise measurement point whose coordinates are ($x_n$, 0) in the electric transmission corridor is $$DB_n^A,$$

and the noise correction value at the noise verification point whose coordinates are ($x_m$, 0) in the electric transmission corridor is $$DB_m^B,$$

and letting x be $x_n$ and z be $$DB_n^A;$$

and fitting an objective function $z=k_1 \sin(k_2x)+k_3e^{k_4x}+k_5x^3+k_6x^2+k_7x+k_8$ to the point sequence to obtain the values of the constants $k_1$, $k_2$, $k_3$, $k_4$, $k_5$, $k_6$, $k_7$, and $k_8$ comprises:

fitting, by using an incremental optimization multi-parameter nonlinear fitting method, the objective function $z=k_1 \sin(k_2x)+k_3e^{k_4x}+k_5x^3+k_6x^2+k_7x+k_8$ to the point sequence to obtain the values of the constants $k_1$, $k_2$, $k_3$, $k_4$, $k_5$, $k_6$, $k_7$, and $k_8$.

3. The method for constructing the transverse audible noise model for the electric transmission corridor according to claim 2, wherein fitting, by using the incremental optimization multi-parameter nonlinear fitting method, the objective function $z=k_1 \sin(k_2x)+k_3e^{k_4x}+k_5x^3+k_6x^2+k_7x+k_8$ to the point sequence comprises:

in step S121: selecting an initial point $$k^0 = (k_1^0, k_2^0, k_3^0, k_4^0, k_5^0, k_6^0, k_7^0, k_8^0),$$

setting an initial parameter $\alpha^0$ to greater than 0, an amplification factor β to greater than 1, and an allowable error ε to greater than 0, and letting i be 1;

in step S122: before an $i^{th}$ iteration, calculating a residual $f(k^{i-1})$ and a quadratic sum $s(k^{i-1})$ of the residual;

calculating $\nabla f(k^{i-1})$ ;

in response to $\|\nabla f(k^{i-1})^T f(k^{i-1})\|<\varepsilon$, ending iteration, $$k_1 = k_1^i, k_2 = k_2^i, k_3 = k_3^i, k_4 = k_4^i, k_5 = k_5^i, k_6 = k_6^i, k_7 = k_7^i, \text{ and } k_8 = k_8^i;$$

and in response to $\|\nabla f(k^{i-1})^T \nabla f(k^{i-1})\|\leq\varepsilon$, executing a next step;

in step S123: calculating $[\nabla f(k^{i-1})^T \nabla f(k^{i-1})+\alpha^{i-1}I]^{-1}$;

in step S124: letting $d^{i-1}=-[\nabla f(k^{i-1})^T \nabla f(k^{i-1})+\alpha^{i-1}I]^{-1}(\nabla f(k^{i-1})^T f(k^{i-1}))$;

calculating a residual $f(k^{i-1}+d^{i-1})$ and a quadratic sum $s(k^{i-1}+d^{i-1})$ of the residual;

in response to $s(k^{i-1}+d^{i-1})\geq s(k^{i-1})$, letting $\alpha^{i-1}=\beta\alpha^{i-1}$, and proceeding to the step S123; and in response to $s(k^{i-1}+d^{i-1})<s(k^{i-1})$, letting $k^i=k^{i-1}+d^{i-1}$, $\alpha^i=\alpha^{i-1}/\beta$, and i=i+1, and proceeding to step S122; and wherein in response to determining that the mean error between $$DB_m^B \text{ and } k_1\sin(k_2x_m) + k_3e^{k_4x_m} + k_5x_m^3 + k_6x_m^2 + k_7x_m + k_8$$

satisfies the accuracy requirements, obtaining the transverse audible noise model for the electric transmission corridor comprises:

in response to determining that the mean error between $$DB_m^B \text{ and } k_1\sin(k_2x_m) + k_3e^{k_4x_m} + k_5x_m^3 + k_6x_m^2 + k_7x_m + k_8$$

is less than ε, obtaining the transverse audible noise model for the electric transmission corridor.

4. The method for constructing the transverse audible noise model for the electric transmission corridor according to claim 3, wherein a value range of N is 20 to 22, a value range of M is 1 to 3, and a value range of ε is 5.5% to 6.5%.

5. The method for constructing the transverse audible noise model for the electric transmission corridor according to claim 3, wherein N is 21, M is 1, and ε is 6%.

6. An audible noise measurement device, comprising microphones, an audible-noise-related meteorological sensor, a sampling circuit, a processor, and an output apparatus, wherein the microphones are disposed on a microphone support apparatus, and the microphones comprise N microphones respectively disposed at N noise measurement points of an electric transmission corridor, M microphones respectively disposed at M noise verification points of the electric transmission corridor, and a microphone disposed at a background noise measurement point of the electric transmission corridor, wherein N is greater than or equal to 10, and M is greater than or equal to 1; wherein the N noise measurement points of the electric transmission corridor are collinear, perpendicular to a projection of a transmission line on a ground, and at a preset height above the ground, each of the M noise verification points of the electric transmission corridor is disposed between two adjacent ones of the N noise measurement points of the electric transmission corridor, and the background noise measurement point of the electric transmission corridor is disposed away from the electric transmission corridor;

the microphones are configured to simultaneously measure noise at the background noise measurement point of the electric transmission corridor, the N noise measurement points of the electric transmission corridor, and the M noise verification points of the electric transmission corridor; and the processor is configured to: individually correct noise values measured at the N noise measurement points of the electric transmission corridor and noise values measured at the M noise verification points of the electric transmission corridor, wherein a number of the multiple microphones is N+M+1;

construct a point sequence in the following manner: letting n range from 1 to N and m range from 1 to M, assuming that a noise correction value at a noise measurement point whose coordinates are $(x_n, 0)$ in the electric transmission corridor is $$DB_n^A,$$

and that a noise correction value at a noise verification point whose coordinates are $(x_m, 0)$ in the electric transmission corridor is $$DB_m^B,$$

and letting x be $x_n$ and z be $$DB_n^A;$$

and fitting an objective function $$z = k_1\sin(k_2x) + k_3e^{k_4x} + k_5x^3 + k_6x^2 + k_7x + k_8$$

to the point sequence to obtain values of constants $k_1$, $k_2$, $k_3$, $k_4$, $k_5$, $k_6$, $k_7$, and $k_8$, wherein $k_1$, $k_2$, $k_3$, $k_4$, $k_5$, $k_6$, $k_7$, and $k_8$ are not all zero simultaneously; and in response to determining that a mean error between $$DB_m^B$$

and $$k_1\sin(k_2x_m) + k_3e^{k_4x_m} + k_5x_m^3 + k_6x_m^2 + k_7x_m + k_8$$

satisfies accuracy requirements, obtain the transverse audible noise model for the electric transmission corridor as follows:

$$z = k_1\sin(k_2x) + k_3e^{k_4x} + k_5x^3 + k_6x^2 + k_7x + k_8,$$

wherein z denotes audible noise at point (x, 0).

7. The audible noise measurement device according to claim 6, wherein the microphone support apparatus comprises a height-adjustable stand, a microphone securing cantilever arm, an electrical shielding cover, a positioning device, and an inductive charge grounding device, wherein the microphone securing cantilever arm is secured to the height-adjustable stand, the electrical shielding cover is secured to a cantilever end of the microphone securing cantilever arm, the inductive charge grounding device is electrically connected to a conductive part of the electrical shielding cover, a conductive part of the height-adjustable stand, and a conductive part of the microphone securing cantilever arm, and the positioning device is secured to the microphone securing cantilever arm; wherein when the microphone support apparatus is used, a microphone is disposed in the electrical shielding cover and secured to the microphone securing cantilever arm, a lead-out wire of the microphone is secured to the microphone securing cantilever arm, and a grounding end of the inductive charge grounding device is grounded.

8. The audible noise measurement device according to claim 7, wherein the height-adjustable stand comprises a tripod, a height adjustment guide rod, and a locking part, wherein a connecting platform of the tripod is provided with a guide hole, the height adjustment guide rod is movably connected to the guide hole, and the locking part is configured to securely connect the height adjustment guide rod and the connecting platform in an axial direction of the guide hole.

9. The audible noise measurement device according to claim 6, wherein the processor is configured to individually correct the noise values measured at the N noise measurement points of the electric transmission corridor and the noise values measured at the M noise verification points of the electric transmission corridor; and construct the point sequence by letting n range from 1 to N, and m range from 1 to M, assuming that the noise correction value at the noise measurement point whose coordinates are $(x_n, 0)$ in the electric transmission corridor is $$DB_n^A,$$

and the noise correction value at the noise verification point whose coordinates are $(x_m, 0)$ in the electric transmission corridor is $$DB_m^B,$$

and letting x be $x_n$ and z be $$DB_n^A;$$

and fitting an objective function $$z = k_1\sin(k_2x) + k_3e^{k_4x} + k_5x^3 + k_6x^2 + k_7x + k_8$$

to the point sequence to obtain the values of the constants $k_1$, $k_2$, $k_3$, $k_4$, $k_5$, $k_6$, $k_7$, and $k_8$ in a following manner:

fitting, by using an incremental optimization multi-parameter nonlinear fitting method, the objective function $$z = k_1\sin(k_2x) + k_3e^{k_4x} + k_5x^3 + k_6x^2 + k_7x + k_8$$

to the point sequence to obtain the values of the constants $k_1$, $k_2$, $k_3$, $k_4$, $k_5$, $k_6$, $k_7$, and $k_8$.

10. The audible noise measurement device according to claim 9, wherein the processor is configured to fit the objective function $$z = k_1 \sin(k_2 x) + k_3 e^{k_4 x} + k_5 x^3 + k_6 x^2 + k_7 x + k_8$$

by using the incremental optimization multi-parameter nonlinear fitting method to the point sequence by:

in step S121: selecting an initial point $$k^0 = (k_1^0, k_2^0, k_3^0, k_4^0, k_5^0, k_6^0, k_7^0, k_8^0),$$

setting an initial parameter $\alpha^0$ to greater than 0, an amplification factor $\beta$ to greater than 1, and an allowable error $\varepsilon$ to greater than 0, and letting i be 1;

in step S122: before an $i^{th}$ iteration, calculating a residual $f(k^{i-1})$ and a quadratic sum $s(k^{i-1})$ of the residual;

calculating $\nabla f(k^{1-1})$;

in response to $\|\nabla f(k_{i-1})^T f(k^{i-1})\| < \varepsilon$, ending iteration, $$k_1 = k_1^i,\ k_2 = k_2^i,\ k_3 = k_3^i,\ k_4 = k_4^i,\ k_5 = k_5^i,\ k_6 = k_6^i,\ k_7 = k_7^i, \text{ and } k_8 = k_8^i;$$

and in response to $\|\nabla f(k^{i-1})^T f(k^{i-1})\| \leq \varepsilon$, executing a next step;

in step S123: calculating $[\nabla f(k^{i-1})^T \nabla f(k^{i-1}) + \alpha^{i-1} I]^{-1}$;

in step S124: letting $d^{i-1} = -[\nabla f(k^{i-1})^T \nabla f(k^{i-1}) + \alpha^{i-1} I]^{-1} (\nabla f(k^{i-1})^T f(k^{i-1}))$;

calculating a residual $f(k^{i-1}+d^{i-1})$ and a quadratic sum $s(k^{io-1}+d^{i-1})$ of the residual;

in response to $s(k^{i-1}+d^{i-1}) \geq s(k^{i-1})$, letting $\alpha^{i-1} = \beta \alpha^{i-1}$, and proceeding to the step S123;

and in response to $s(k^{i-1}+d^{i-1}) < s(k^{i-1})$, letting $k' = k^{i-1} + d^{i-1}$, $$\alpha^i = \frac{\alpha^{i-1}}{\beta},$$

and i=i+1, and proceeding to step S122; and wherein in response to determining that the mean error between $$DB_m^B$$

and $$k_1 \sin(k_2 x_m) + k_3 e^{k_4 x_m} + k_5 x_m^3 + k_6 x_m^2 + k_7 x_m + k_8$$

satisfies the accuracy requirements, obtaining the transverse audible noise model for the electric transmission corridor comprises:

in response to determining that the mean error between $$DB_m^B$$

and $$k_1 \sin(k_2 x_m) + k_3 e^{k_4 x_m} + k_5 x_m^3 + k_6 x_m^2 + k_7 x_m + k_8$$

is less than $\varepsilon$, obtaining the transverse audible noise model for the electric transmission corridor.

11. The audible noise measurement device according to claim 10, wherein a value range of N is 20 to 22, a value range of M is 1 to 3, and a value range of $\varepsilon$ is 5.5% to 6.5%.

12. The audible noise measurement device according to claim 10, wherein N is 21, M is 1, and $\varepsilon$ is 6%.

* * * * *